March 27, 1945.   S. C. RIEKE   2,372,225
FRUIT AND VEGETABLE WAXER
Filed Aug. 1, 1939   3 Sheets-Sheet 1

Inventor
S. C. Rieke
By Wilkinson & Mawhinney
Attorneys.

March 27, 1945. S. C. RIEKE 2,372,225
FRUIT AND VEGETABLE WAXER
Filed Aug. 1, 1939 3 Sheets-Sheet 2

Inventor
S. C. Rieke
By Wilkinson & Mawhinney
Attorneys.

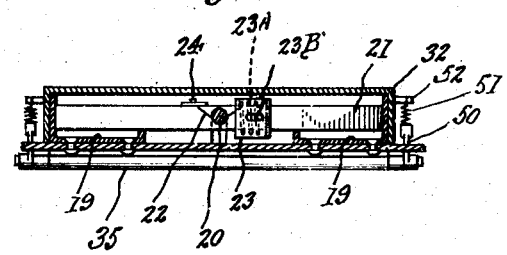
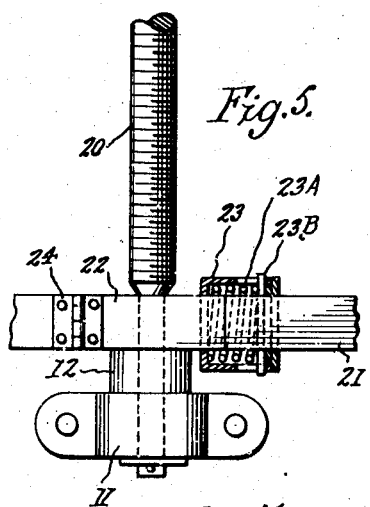
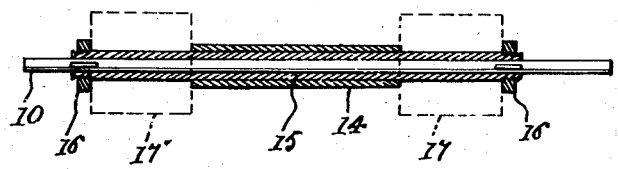
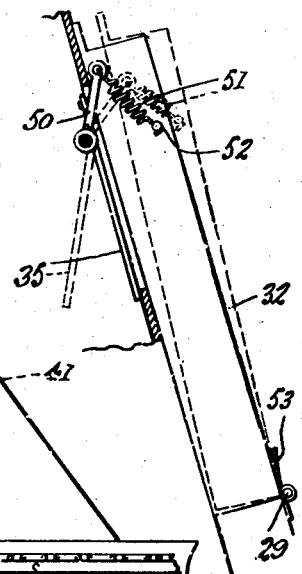
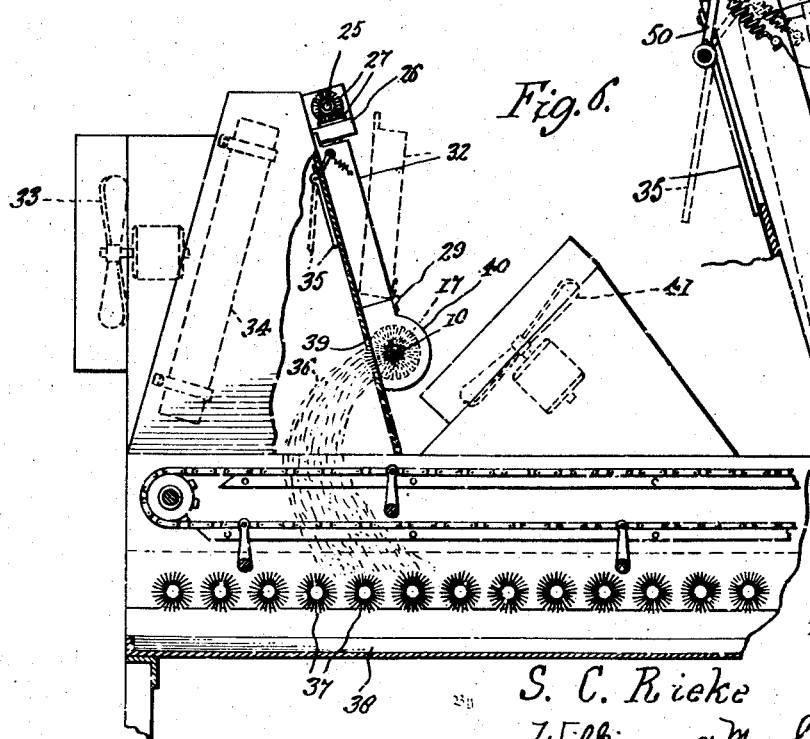

Patented Mar. 27, 1945

2,372,225

UNITED STATES PATENT OFFICE 2,372,225

FRUIT AND VEGETABLE WAXER

Sidney C. Rieke, Mission, Tex.

Application August 1, 1939, Serial No. 287,813

11 Claims. (Cl. 99—168)

The present invention relates to improvements in fruit and vegetable waxers and has for an object to apply a wax coating to oranges, grapefruits, and other citrus fruits.

More particularly the invention aims to provide a device in conjunction with citrus fruit cleansing machines for the purpose of applying a wax coating to the fruit in which the wax is converted into a powder or mist and applied preferably in a heated condition which increases its tendency to adhere easily to the skins of the fruit or vegetables.

A further object of the invention is to provide improved means, in a device such as above outlined, by which wax in slab form may be conveniently and effectively fed to the heating and dispersing means by which the converted powder or mist is circulated to the fruit on a machine below.

A still further object of the invention is to provide means whereby the action of the device will be automatically suspended whenever the fans are out of operation.

With the foregoing and other objects in view which will become readily apparent to those skilled in the art the invention will be more particularly described hereinafter and more fully pointed out in the appended claims.

In the drawings, in which similar reference characters identify like parts throughout, Fig. 1 is a vertical transverse section taken through a waxing machine constructed in accordance with the present invention.

Fig. 3 is a horizontal section taken on the line 3—3 in Fig. 1.

Fig. 4 is a longitudinal section taken through the shaft assembly for the wire distributing brushes.

Fig. 5 is an enlarged fragmentary elevation of the lower portion of the wax feeding shaft and its bearing and feeding assembly.

Fig. 6 is a fragmentary vertical section showing the conventional machine and improved attachment in side elevation.

Fig. 7 is a fragmentary side view of the chute and cover showing the means for automatically opening the cover.

Figure 1:
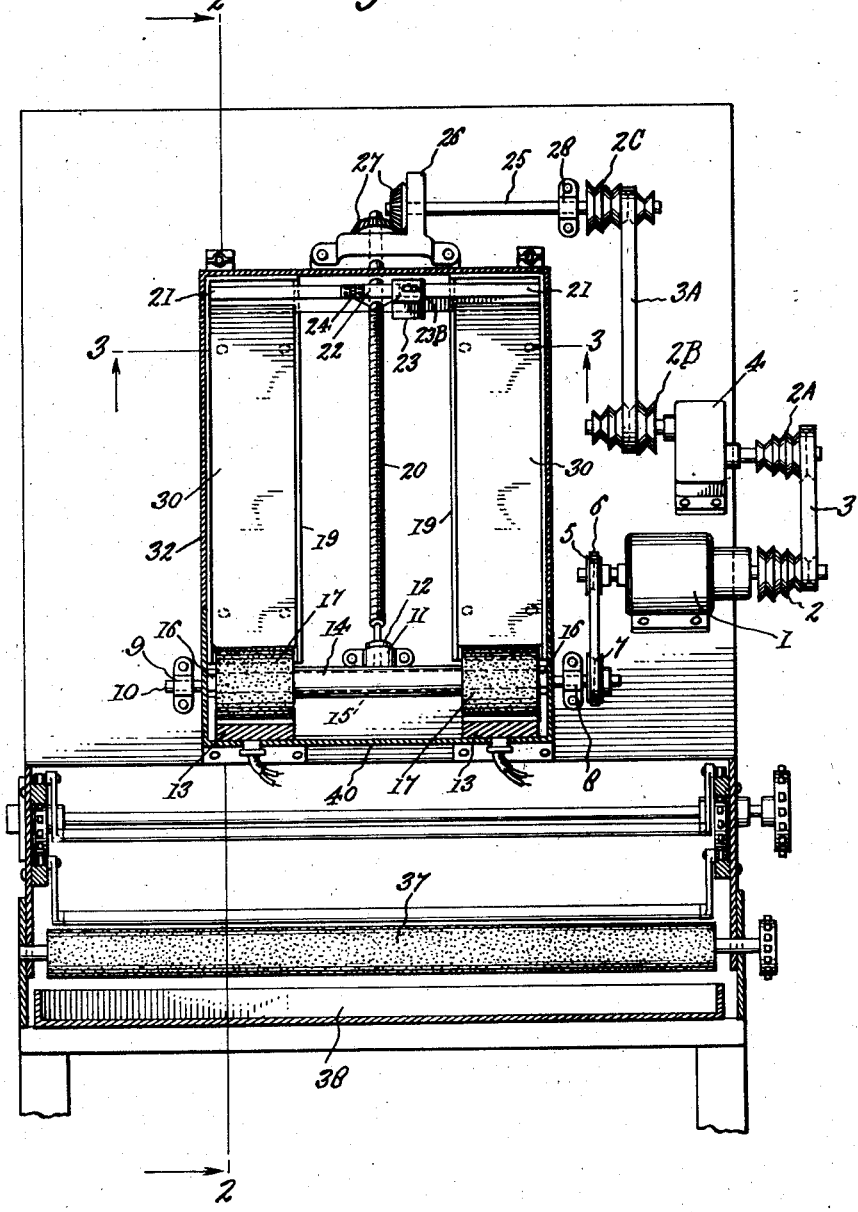

An improved form of waxing machine is also disclosed and claimed in my copending application Serial No. 467,003 filed November 26, 1942, while a wax cake and the method of making the same is disclosed and claimed in my copending application 441,231, filed April 30, 1942, for Fruit and vegetable coating wax.

Referring more particularly to the drawings, 1 designates a back-geared motor having thereon a step-grooved pulley 2 on the shaft thereof which may rotate at approximately 290 R. P. M. This pulley 2 connects with a similar pulley 2-A by means of a belt 3, preferably a V-belt. The pulley 2-A drives a speed reducer 4. Such speed reducer carries a step-grooved pulley 2-B connected by belt 3-A with a step-grooved pulley 2-C on a line drive shaft 25.

The other shaft of the motor 1 operating preferably or for example at 1,740 R. P. M. carries a pulley 5, preferably a V-pulley, over which is trained a belt 6 connecting with a pulley 7 upon an operating shaft 10. Such shaft 10 rotates in bearings 8 and 9 mounted in appropriate framework.

At 11 is indicated a bearing for the feed shaft, 20, with which is associated a stop 12.

Heating units 13 extend about the wire wheels 17 which wire wheels or brushes are arranged to be driven by the shaft 10.

Referring more particularly to Fig. 4, the wire wheels 17 are held an appropriate distance apart by spacing sleeve 14, such sleeve being carried upon a mounting sleeve 15 on which the brushes or wire wheels 17 are directly mounted and securely fixed by means of nuts 16 threaded upon the externally threaded ends of the mounting sleeve 15, which ends project beyond the ends of the wire wheels 17. The nuts 16 therefore have the effect to bind the rotary wire wheels firmly against the ends of the spacing sleeve 14.

The mounting sleeve 15 is keyed to the shaft 10 and is required to rotate therewith.

Wax guides 18 are shown supported directly above the wire wheels 17 and in the lower end of a chute 19 in which the wax is carried.

The feed shaft 20 is externally screw threaded and carries feed arms 21. Such feed arms are in effect a single beam extending in common to both chutes 19, two such chutes being shown, one chute in connection with each of the two wire wheels 17 employed. In the central portion of the beam feed arm the same is screw threaded to mate with the threads on the shaft 20 whereby the feed beam will be moved axially along the shaft when the latter is rotated. At the central portion of the beam a hinged section 22 is provided which may open out to permit the freeing of the beam from the feed shaft 20; for instance, for the purpose of restoring the feed beam to the upper initial position after it has been moved down the entire length of the shaft 20.

This hinged section 22 is more particularly shown in Figs. 3 and 5. Its free end is received and normally retained by a holding sleeve 23 which is slidably mounted along the beam 21. In this holding sleeve 23 is a coil spring 23—A, one end of which abuts against a pin 23—B passing through and affixed to the beam 21 whereby the pin is immovable while the sleeve 23 may be slid back to the right in Fig. 5 to release the free end of the hinged section 22. Any other form of holding and releasing device may be utilized for this purpose. The hinge for the section 22 is represented at 24.

The screw feed shaft 20 is driven by the line shaft 25 through bevel pinions 27. The line shaft is journaled in bearings 26 and 28.

The wax chutes are enclosed by one or more covers 32 hinged, as indicated at 29, to fixed casings 40 which enclose the wire wheels 17. By virtue of the hinged connections 29 the covers 32 may be drawn down for the purpose of replenishing the magazines with wax in the slab form indicated at 30.

Referring more particularly to Fig. 6, 33 represents a fan and motor and 34 represents a gas heater. Carried by the chute and in the line of draft of the fan 33 is a baffle plate 35 coupled to the hinged cover 32 in such way that the hood or cover 32 will be lifted when the fan is not in operation whereby to prevent the melting of wax when a heating unit is energized without the fan being turned on. When the fan is rotating and the heating unit is energized the temperature will remain uniform.

Still referring to Fig. 6, at 36 is represented a powder spray or mist directed from the wire brushes 17 outwardly and downwardly toward the fruit which is being moved along the transverse brushes 37. 39 shows the opening in the casing 40 below the chute 19 through which this spray emerges wherein it will be noted that because of the inclination of the chute 19 the spray will be directed partially downward. It will also tend to drop by gravity and is in a favorable position to encounter the fruit on the brushes 37 below. Such of the wax as does not encounter the fruit will be caught upon a pan 38 disposed below the transverse brushes 37.

Although the heating units 13 are shown and described as extending about portions of the peripheries of the wire wheels 17, it will be understood that thermostatic or other heating units of electrical or other form may be inserted axially within the wire brushes if desired.

Still referring to Fig. 6, 41 indicates a second fan and motor disposed obliquely with respect to the chute 19 and its cover 32.

In the use of the device, the heating units 13 are energized from an appropriate source of electricity and the fans put in operation.

The motor 1 is also put in operation and directly drives at high speed the wire wheels 17 and at a reduced speed the line shaft 25 and the screw feed shaft 20. Thus, the beam or feed arms are moved slowly downward forcing the slab of wax 30 toward the rapidly rotating peripheral edges of the wire wheels 17, both the wax and the wire of the brushes being heated by the heating elements 13.

Figure 2:
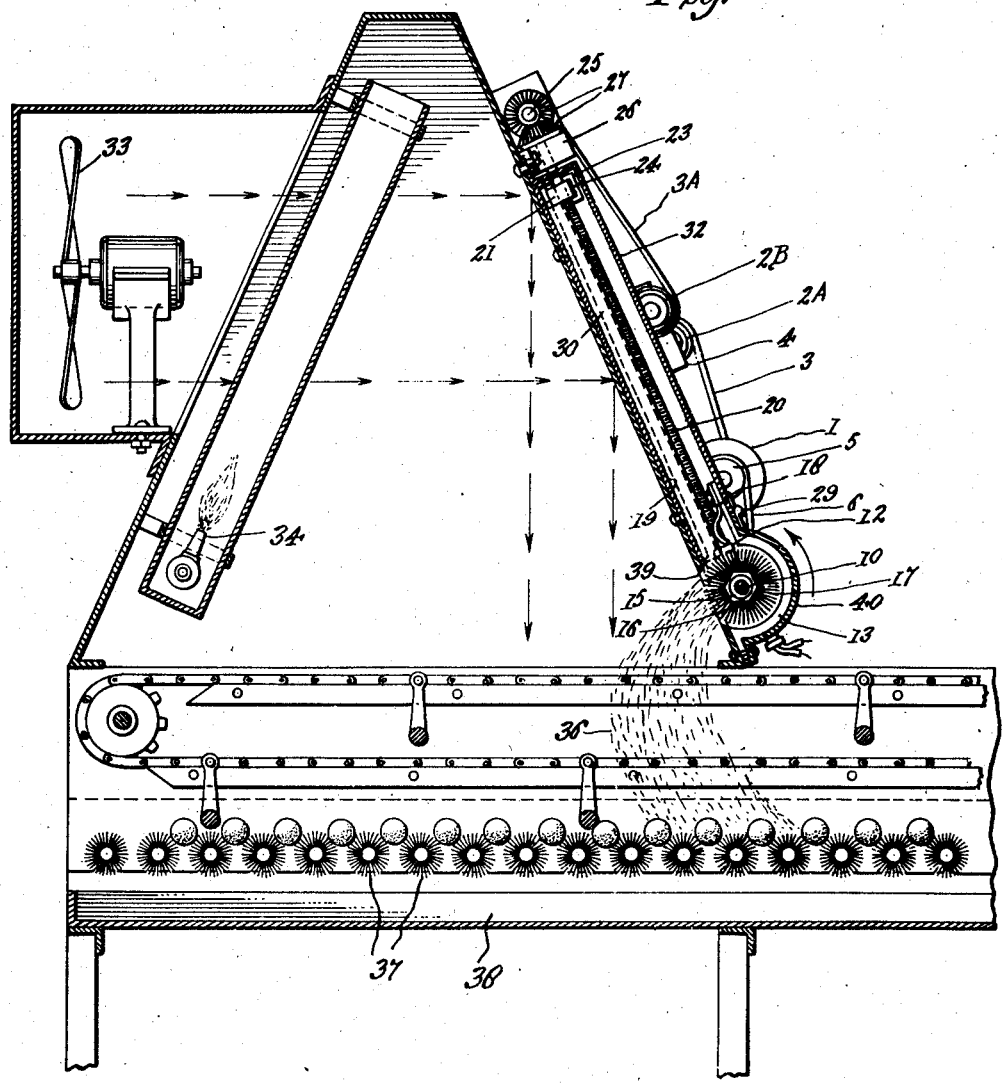
Fig. 2 is a fragmentary longitudinal vertical section taken on the line 2—2 in Fig. 1.

The rapidly rotating heated sharp ends of the numerous wire bristles encountering the heated wax will set up a powder or mist. The rotation of the wire wheels is as indicated by the arrow in Fig. 2, the effect of which is to drive the spray or mist out through the opening 39 in the chute and downwardly upon the fruit below.

The guides 18 will press the wax slabs 30 against the base walls of the chutes 19, thus frictionally holding the wax slabs in place and against unduly rapid descent upon the wire bristles; in this way permitting substantially of the movement of the wax slabs only by virtue of the motion derived from the screw feed shaft 20 through the feeding arms 21.

The heated air from the fan 33 intercepted by the inclined wall 19 of the chute will tend to deflect such air downwardly and past the opening 39 whereby the powder or wax mist will become entrained with the stream of air, the stream of air being so directed relatively as to carry the wax downwardly toward the fruit. In this way both the stream of air from the fan and the direction of motion of the rotary wire brushes will contribute to direct the wax in the powdered or mist form upon the fruit which is being rotated by the transverse brushes 37 so that all portions of the exteriors of the fruit skins are exposed to application of the wax. The wax, particularly where it is heated, will increase in its adherence to the skins and due also to the finely divided condition of the wax such wax will be more easily brought into contact with the skins of the fruit and the coating will result more uniformly as to thickness.

It will be understood that the wax may be heated to a point just short of its melting point in which event the wax will remain in the form of a powder though in a plastic state by which it will adhere easily to the fruit or vegetables; or it may be heated above the melting point of the wax, in which event a fine mist is produced, which mist adheres still more readily to the fruit or vegetables.

In accordance with Figure 7 the baffle 35 is shown in a dotted position with its arms 50, also in a dotted position lowered so that their attached coil springs 51 may be eased off as to tension. In full lines baffle 35 is shown as moved over against the bottom of the chute and its arms 50 are raised thus drawing up on the coil springs 51. The coil springs are detachably coupled to the cover 32 as shown at 52. Therefore the movement of baffle plate 35 and its arms 50 to the full line position of Figure 6 pulls upon the springs 51 closing cover 32 and holding it closed by placing a slight, or for that matter a great tension upon the coil springs 51. When the action of the fan 33 ceases, the baffle 35 will tend by gravity to swing to the dotted line position, in which motion it will be assisted by the coil springs 51 tending to contract. At such times the springs 53 associated with the hinge 29 will automatically open the cover 32.

When it is desired to swing the cover 32 to the fully open position the coil springs may be detached therefrom at the point 52. As shown in Figure 3 two arms 50 and two coil springs 51 are shown at the sides of the cover.

The device may be made to accommodate various different fruit and vegetable machines. For example, on some machines I may feed the wax from the bottom and reverse the rotation of the wire wheels. I may employ one or more wire wheels depending upon the width of the machine to which the device may be attached.

Also substitutes may be employed for the wire wheels. Instead of slab wax I may use liquid or semi-liquid that may be spread by the rotating wire or other wheels.

It will be understood that I have illustrated and described only one physical embodiment of the invention but that such invention is susceptible of embodiment in a great many other forms; and that I do not wish to be restricted to the details of construction herein shown and described except as may be required by the subjoined claims.

I claim:

1. In a fruit and vegetable waxer, a magazine for wax, wax feeding means in said magazine, said magazine having an outlet opening, a powdering member opposite the opening in operative relation to said wax, heating means adjacent said member, draft means, a baffle disposed in the path of the draft created by said draft means, and a movable cover for the magazine operably connected with said baffle whereby the cover will be opened when the draft is discontinued.

2. A waxing device for fruit and the like comprising means for holding and feeding a body of wax, wire wheels carried in contacting relation with said body of wax, a mounting sleeve for fixedly supporting said wire wheels, a spacing sleeve on the mounting sleeve for engaging the near ends of said wire wheels, securing means on the outer ends of the mounting sleeve for binding the wire wheels against said spacing sleeve, and an operating shaft keyed to said mounting sleeve.

3. A fruit and vegetable waxer comprising supporting means for a mass of solid wax, said means having an outlet aperture for the wax, a rapidly rotating element mounted in contacting relation with the wax at said aperture, means for feeding the wax toward said element, a casing for the rotating element having an opening directly at the point of contact of said rotating element and the wax, and a conveyor for moving the fruit directly below and close to said opening.

4. A fruit and vegetable waxes comprising supporting means for a mass of solid wax, said means having an outlet aperture for the wax, a rapidly rotating element mounted in contacting relation with the wax at said aperture, means for feeding the wax toward said element, a casing for the rotating element having an opening directly adjacent the point of contact of said rotating element and the wax, and heating means disposed intermediate the casing and said rotating element to heat said element during contact with the wax.

5. In a fruit and vegetable waxer a chute for holding a solid mass of wax, a wire wheel mounted to rotate in contact with the wax at the lower portion of said chute, a casing for the wheel having an opening contiguous with the point of contact of the wax and said wheel, feeding means for progressively moving the wax against said wheel, means for rotating the wheel adapted to cause powdering of the wax and discharge thereof from said opening substantially simultaneously with the powdering, and a conveyor for the fruit directly below and close to the opening to receive the powdered wax therefrom before evaporation.

6. In a fruit and vegetable waxer a chute for holding a solid mass of wax, a wire wheel mounted to rotate in contact with the wax at the lower portion of said chute, a casing for the wheel having an opening contiguous with the point of contact of the wax and said wheel, feeding means for progressively moving the wax against said wheel, means for rotating the wheel adapted to cause powdering of the wax and discharge thereof from said opening substantially simultaneously with the powdering, and heating means for said wheel disposed within said casing adapted to plasticize the wax during powdering.

7. In combination, a conveying and polishing unit for fruit, a waxing mechanism positioned over said unit comprising combined feeding and supporting means for a solid mass of wax, said means having an aperture for the wax, disintegrating means for the wax comprising a high speed rotary element mounted at said aperture, a casing for the rotary element having an opening positioned to effect discharge of the wax from said casing substantially simultaneously with disintegration thereof, said casing with the opening disposed to provide unrestricted passage of disintegrated wax to said conveying unit, said rotary element positioned relative to said opening whereby upon rotation to project the disintegrated wax downwardly on said fruit, said conveying and polishing unit located close to and directly beneath said opening.

8. In combination a conveying unit for fruit and a fruit waxing mechanism, a frame positioned over said conveying unit and carrying the waxing mechanism, said waxing mechanism comprising a holder for a slab of wax, feeding means to move the wax from said holder, and powdering means for the wax comprising a rapidly rotatable element mounted to contact wax fed from the holder, said frame having an interior part provided with a relatively large free space directly over and in contact with the conveying unit, the point of contact of the wax and rotatable element being positioned to effect discharge of the powdered wax into said space whereby to shower the wax immediately and directly upon the fruit on the conveying unit.

9. In an apparatus for coating fruit and the like articles with a waxy material, a conveyor for the fruit, a support for the wax in cake form directly above the conveyor, and means to pulverize the wax and distribute the powder thus formed directly to the moving fruit before evaporation tends to dry the particles.

10. The combination with a fruit and the like conveyor of a coating attachment, said attachment being disposed above said conveyor, means on said attachment to support coating wax in cake form, closely adjacent the articles on the conveyor, and means to cut the wax from the cake into fine particles and to distribute the particles directly to the articles as the particles are formed so as to avoid evaporation and before the particles become less tacky, an additional means to positively feed the wax to said cutting means.

11. In a continuous process of coating fruit and vegetables with a waxy material to prevent withering and shrinkage, the steps of providing a coating material in cake form, positioning the cake closely adjacent and above the continuously moving articles to be coated, brushing the material from the cake in the form of finely divided particles which are relatively soft, showering such fine particles by gravity on to the articles through the distance from the cake directly downwardly upon the articles so that exposure of the particles to the air for such distance causes the particles to be somewhat tacky so as to adhere to the articles, but where such showering contact with the articles occurs before sufficient evaporation to permit the particles to become non-tacky, and brushing the articles to provide distribution of the coating.

SIDNEY C. RIEKE.